US012222262B2

(12) United States Patent
Herdlitschka et al.

(10) Patent No.: US 12,222,262 B2
(45) Date of Patent: Feb. 11, 2025

(54) APPARATUS FOR DETECTING A GAS IN A HEADSPACE OF A CONTAINER

(71) Applicant: WILCO AG, Wohlen (CH)

(72) Inventors: Christophe Herdlitschka, Zürich (CH); Matthias Kahl, Lörrach (DE)

(73) Assignee: WILCO AG, Wohlen (CH)

( * ) Notice: Subject to any disclaimer, the term of this patent is extended or adjusted under 35 U.S.C. 154(b) by 716 days.

(21) Appl. No.: 16/972,782

(22) PCT Filed: Jun. 5, 2019

(86) PCT No.: PCT/EP2019/064696
§ 371 (c)(1),
(2) Date: Dec. 7, 2020

(87) PCT Pub. No.: WO2019/234118
PCT Pub. Date: Dec. 12, 2019

(65) Prior Publication Data
US 2021/0247264 A1 Aug. 12, 2021

(30) Foreign Application Priority Data

Jun. 7, 2018 (CH) .................................... 00738/18

(51) Int. Cl.
*G01M 3/32* (2006.01)
*G01M 3/38* (2006.01)
(Continued)

(52) U.S. Cl.
CPC .......... *G01M 3/329* (2013.01); *G01M 3/3272* (2013.01); *G01M 3/38* (2013.01);
(Continued)

(58) Field of Classification Search
CPC .................................................. G01M 3/329
See application file for complete search history.

(56) References Cited

U.S. PATENT DOCUMENTS

| 5,002,397 | A | 3/1991 | Ingrum et al. |
| 8,379,209 | B2 * | 2/2013 | Yokobayashi ..... G01N 21/0303 |
| | | | 356/437 |

(Continued)

FOREIGN PATENT DOCUMENTS

| EP | 2979143 B1 * | 8/2017 | ............ G01M 3/229 |
| JP | 2012531599 A * | 12/2012 | ............ G01M 3/229 |

(Continued)

OTHER PUBLICATIONS

Duncan et al.; "White Paper: Using Laser-Based Headspace Moisture Analysis for Rapid Nondestructive Moisture Determination of Sterile Freeze-Dried Product;" 2016; Internet: https://web.archive.org/web/20160327181434if_/http://ww.biopharm.co.uk:80/wp-content/uploads/2010/08/fms_whitepaper_sml.pdf; retrieved Aug. 17, 2019.

(Continued)

*Primary Examiner* — Ryan D Walsh
(74) *Attorney, Agent, or Firm* — Oliff PLC

(57) ABSTRACT

A transmitter-receiver arrangement for measuring concentration of gas and/or for measuring pressure in a container headspace, wherein the transmitter-receiver arrangement defines a measuring zone accommodating the headspace, and the transmitter-receiver arrangement includes a transmitter to emit electromagnetic radiation covering a wavelength range including an absorption line of gas, a receiver of electromagnetic radiation in the wavelength range, the receiver and transmitter positioned respective to each other defining a path for the electromagnetic radiation from the transmitter to the receiver, a fixating element for fixating the transmitter-receiver arrangement to the apparatus or filling machine, an electrically controllable actuator arrangement causing at least one common shift of the transmitter and receiver, a shift of the transmitter relative to the receiver, a change in spatial orientation of the transmitter and receiver relative to the fixating element, and a change in spatial (Continued)

Figure 1:
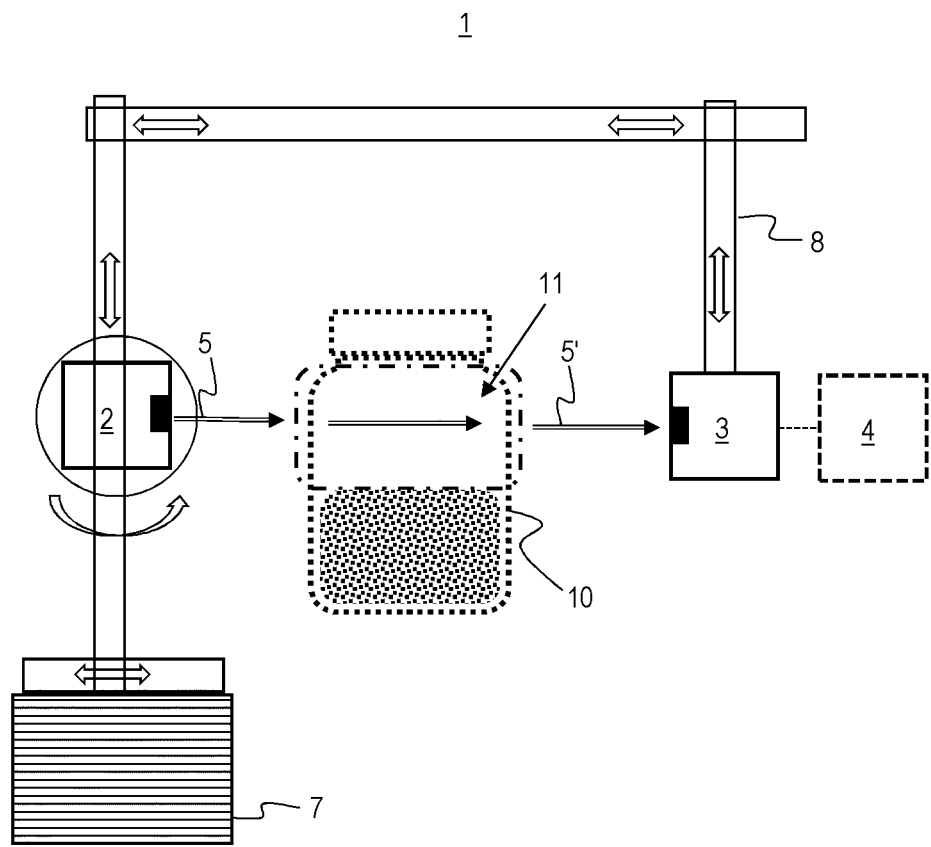

orientation of the transmitter relative to a spatial orientation of the receiver.

17 Claims, 2 Drawing Sheets

(51) Int. Cl.
  *G01N 21/01* (2006.01)
  *G01N 21/3504* (2014.01)
  *G01N 21/359* (2014.01)
  *G01N 21/90* (2006.01)
(52) U.S. Cl.
  CPC ......... *G01N 21/01* (2013.01); *G01N 21/3504* (2013.01); *G01N 21/359* (2013.01); *G01N 21/90* (2013.01); *G01N 2021/0187* (2013.01); *G01N 2201/0612* (2013.01)

(56) References Cited

U.S. PATENT DOCUMENTS

| | | | |
|---|---|---|---|
| 10,571,351 B2 * | 2/2020 | Forestelli | G01M 3/38 |
| 10,816,481 B2 * | 10/2020 | Forestelli | B65B 3/00 |
| 11,002,673 B2 * | 5/2021 | Kundert | G01N 21/0303 |
| 2005/0084974 A1 | 4/2005 | Veale et al. | |
| 2014/0029007 A1 | 1/2014 | Yokobayashi et al. | |
| 2016/0169796 A1 * | 6/2016 | Lewander Xu | G01N 21/27 356/437 |
| 2017/0023488 A1 | 1/2017 | Okamoto et al. | |
| 2020/0056957 A1 * | 2/2020 | Black | G01M 3/3209 |
| 2020/0284720 A1 * | 9/2020 | Wertli | G01J 3/0205 |

FOREIGN PATENT DOCUMENTS

| | | | | |
|---|---|---|---|---|
| WO | 2005/111585 A2 | 11/2005 | | |
| WO | WO-2019076838 A1 * | 4/2019 | | G01M 3/38 |
| WO | WO-2021170755 A1 * | 9/2021 | | G01M 3/226 |

OTHER PUBLICATIONS

Aug. 28, 2019 Search Report issued in International Patent Application No. PCT/EP2019/064696.

Aug. 28, 2019 Written Opinion of the International Searching Authority issued in International Patent Application No. PCT/EP2019/064696.

* cited by examiner

APPARATUS FOR DETECTING A GAS IN A HEADSPACE OF A CONTAINER

The invention addressed herein relates to an apparatus for measuring a concentration of a specific gas and/or for measuring a pressure in a headspace of a container. Under further aspects, the invention relates to a method of measuring a concentration of a specific gas and/or for measuring a pressure in a headspace of a container making use of the apparatus.

It is known that contact with a gas, in particular contact with non-inert gases such as oxygen, may reduce the quality of foodstuff or pharmaceutical products over the course of time. E.g. having a low amount of residual oxygen in the container for pharmaceutical products is essential to achieve sufficiently long shelf life of the respective product. To achieve this, an inert gas, typically nitrogen, is introduced into the container in the course of the packaging process in order to displace air from the container. For sensitive pharmaceutical products, a typically required limit on the percentage of residual oxygen is in the range 1-2% of oxygen. Requirements tend to go in direction of 0.5% or less of residual oxygen.

The residual oxygen content of a container after packaging may be verified off-line by an operator. For this purpose, individual samples are removed from the packaging line. Destructive or non-destructive analysis methods may be applied to determine the amount of residual oxygen in the filled and closed containers. This is however a point in time, which is relatively late in the process, such that in case of a malfunction a large number of containers may be affected. In this case, an economic loss may not be prevented despite the analysis of the residual oxygen contents of some samples. Therefore, measuring a gas concentration in a headspace of filled containers at an earlier point in the process is desired in high-throughput filling and/or closing machines. However, specifically in high-throughput filling and/or closing machines space is limited and additional handling or measuring steps are difficult to implement.

The object of the present invention is to provide an apparatus, which avoids drawbacks of the state of the art.

This object is achieved by a transmitter-receiver arrangement according to claim 1.

It is a transmitter-receiver arrangement for an apparatus for measuring a concentration of a first gas and/or for measuring a pressure in a headspace of a container. The transmitter-receiver arrangement defines a measuring zone for accommodating the headspace, and the transmitter-receiver arrangement comprises
- a transmitter configured to emit electromagnetic radiation covering a wavelength range including an absorption line of the first gas,
- a receiver configured to receive electromagnetic radiation in the wavelength range, wherein the receiver and the transmitter are oriented with respect to each other such as to define a radiation path for the electromagnetic radiation from the transmitter across the measuring zone to the receiver,
- a fixating element for fixating the transmitter-receiver arrangement to an apparatus or to a filling machine, and
- an electrically controllable actuator arrangement configured to cause at least one of
    - a common translatory and/or rotational displacement of the transmitter and of the receiver relative to the fixating element,
    - a mutual relative translatory and/or rotational displacement of said transmitter relative to the receiver,
    - a change in spatial orientation of the transmitter and the receiver relative to the fixating element, and of
    - a change in spatial orientation of the transmitter relative to a spatial orientation of the receiver.

The inventor has recognized that, because the percentage of residual gas, specifically non-inert gas, such as oxygen, in the container is critical for the quality of the product, there is a need to monitor the quantity of residual gas within the container as close as possible to the moment of filling the container with inert gas. This goal is achieved by the transmitter-receiver arrangement according to the invention. Specifically, the transmitter-receiver arrangement enables an adjustment to specific container types and dimensions without manual intervention of an operator. This has the advantage that the transmitter-receiver arrangement can be built compact and may be mounted in places, where space is limited.

The electrically controllable actuator arrangement may comprise one or several servo- or step motor-driven linear axis or rotary axis. The actuator arrangement may comprise a vertical axis configured to move the transmitter and receiver together to a vertical position corresponding to the vertical position of the headspace to be analysed. A horizontal axis may enable directing of the incoming electromagnetic radiation to a position, where the path through the headspace is maximum or where a minimum reflection occurs. An angle of an outgoing beam may be adjusted to compensate for refractive properties of a container wall. Additionally, an optical element may be applied in order to form the beam, scatter it and/or change its shape and/or its temporal and/or spatial coherence.

The adjustable positions may depend on the type of container, such as vial, syringe, cartridge, bottle. They may depend on the size of the container as well as the filling height. As an example, an adjustment of a vertical position in a range from 10 mm to 120 mm above a plane of a transport means may be enabled by a servo- or step motor-driven linear axis which is vertically oriented.

Thus, the electrically controllable actuator arrangement is configured to cause at least one of a common displacement of the transmitter and of the receiver relative to the fixating element, a displacement of the transmitter relative to the receiver, a change in spatial orientation of the transmitter and the receiver relative to the fixating element, and a change in spatial orientation of the transmitter relative to a spatial orientation of the receiver.

A displacement of the transmitter or the receiver changes its position, which may be defined in a cartesian coordinate system. A change in spatial orientation may e.g. be achieved by a rotation around an axis of the cartesian coordinate system, which may be described as tilting the transmitter or the receiver.

As an example, the electromagnetic radiation may be infrared radiation. Infrared absorption spectroscopy is a known method, which is suitable to determine the concentration of specific monitored gases in a container as well as a pressure within the container. This method allows to determine a concentration of a gas and/or a pressure in a headspace of a container in a non-invasive way, i.e. without the need of entering with a part of the measuring apparatus into the container. It has the advantage, that only infrared radiation passes through the walls of the container and through the gaseous phase in the headspace. The radiation intensity of the infrared radiation is reduced in absorption bands specific for different species of gas. A characteristic absorption band of the first gas may be selected to lie in the wavelength range.

In an embodiment of the transmitter-receiver arrangement the first gas is a non-inert gas.

As the percentage of non-inert gas in a container is critical for the quality of the product, there is a need to monitor this quantity.

In an embodiment of the transmitter-receiver arrangement the first gas is oxygen and wherein the wavelength range includes the wavelength 760 nm.

Assuring a low oxygen concentration is of particular importance when packaging pharmaceutical products or foodstuff. Observing the characteristic absorption line close to a wavelength of 760 nm leads to a reliable detection of molecular oxygen.

In an embodiment of the transmitter-receiver arrangement the transmitter comprises a tuneable diode laser adapted to emit electromagnetic radiation in the wavelength range.

With a tuneable diode laser, a desired wavelength range may be covered by sweeping the central wavelength of a relatively narrow wavelength band emitted by the tuneable diode laser over time through the complete wavelength range used for detecting the first gas. The use of a tuneable diode laser enables the scanning of a wavelength range larger than the bandwidth of the laser radiation and can consequently provide intensity over wavelength datasets for various wavelengths. To achieve this, the wavelength of the laser may be modulated according to a saw tooth profile.

This modulation may additionally be superposed by a further modulation, e.g. with a rapid sinusoid, in order to allow lock-in amplification or higher order harmonics analysis of a signal arriving on the receiver side.

In an embodiment, the transmitter-receiver arrangement further comprises a casing defining an interior space and having an outer surface towards an exterior space, wherein the exterior space includes the measuring zone, and wherein the electrically controllable actuator arrangement is located in the interior space.

Separating the measuring zone from the actuator arrangement alleviates possible cleanliness issues. There exists typically an open space between the measuring zone and a location, where the container is filled. Any particles produced when operating the actuator elements are kept in the interior space of the casing. Furthermore, the casing increases security of operation, as involuntary collisions with moving parts, which are shifted or rotated by the electrical controllable actuator arrangement, are prevented.

In an embodiment of the transmitter-receiver arrangement the transmitter is arranged in the interior space and is separated from the measuring zone by a window, which is transparent in the wavelength range and which forms at least a part of the outer surface, and wherein the receiver is arranged in the interior space and is separated from the measuring zone by the window or by a further window, which is transparent in the wavelength range and which forms a part of the outer surface.

This embodiment allows further to separate transmitter and receiver from the measuring zone.

In another embodiment the casing may comprise multiple parts and the interior space may comprise multiple sub-spaces, in particular the transmitter may be arranged in a first sub-space of said interior space and the receiver may be arranged in a second sub-space of said interior space, with the second sub-space being separated from the first sub-space.

In an embodiment of the transmitter-receiver arrangement at least a predominant part of the outer surface is formed by materials being resistant to hydrogen peroxide and/or wherein said outer surface has an arithmetic average roughness below or equal to 1.6 micrometers and/or said outer surface has no indentation and/or said outer surface has a geometry, for which an orientation avoiding horizontal faces exists.

With an outer surface, which is formed by materials being resistant to hydrogen peroxide, the transmitter-receiver arrangement may undergo a low temperature sterilization process, wherein vaporized hydrogen peroxide is applied, without damaging the transmitter-receiver arrangement. Suitable materials are e.g. stainless steel or sapphire. The latter is in addition suitable for transparent windows. The inventor has recognized that the listed properties of the outer surface contribute individually and in combination to a clean room suitability of the transmitter-receiver arrangement. Thus, a transmitter-receiver arrangement according to this embodiment has the advantage that it can be placed close to a filling and/or closing station which requires a clean room environment. The arithmetic average roughness, also known as $R_a$ value, is the arithmetic average value of a filtered roughness profile determined from deviations about the center line within an evaluation length. $R_a$ values below 1.6 micrometers are suitable for surfaces of an apparatus used in clean room environment. When mounted to the apparatus or in the filling machine, the outer surface of the casing may be mounted such that at least predominant parts are not horizontal. To achieve this, the outer surface may be curved. As an example, the casing may have an arched ceiling. Another way to avoid horizontal parts is to form an upper part of the casing in form of a saddle shape. Preferably, upper faces of the casing deviate by an angle from 30° to 45° from a horizontal orientation in their mounted position.

In an embodiment of the transmitter-receiver arrangement the casing is gas-tight.

A gas-tight casing further broadens the spectrum of possible applications, in particular in fields, where strict requirements exist regarding particle density or aseptic surrounding. Furthermore, a gas tight casing may be permanently filled with a second gas being different from the first gas to be measured, such that no unwanted contribution to a measuring signal results from a presence of the first gas along a section of the radiation path between the transmitter and the receiver, which lies inside the casing.

In an embodiment, the transmitter-receiver arrangement further comprises a source of a second gas configured to flood a region along the radiation path for the electromagnetic radiation with the second gas.

With this embodiment, the first gas may be displaced from the surrounding of the container, such that no contribution to a measuring signal characteristic for the first gas stems from the surrounding the container to be tested. The second gas may e.g. be nitrogen in the case of oxygen being the first gas. The source of second gas may be configured to flood an interior space of a casing of the transmitter-receiver arrangement, if such a casing is present. The source of second gas may include openings directed to the measuring zone.

In another embodiment a beam-guiding beam-delivery system, e.g. an optical waveguide, for instance comprising one or more optical fibers, may be used to pass the measuring beam from the emitter to the measuring zone, in order to avoid the influence of the surrounding gas on the beam.

The preaddressed embodiments may be combined with any other of the embodiments unless in contradiction.

Further in the scope of the invention lies an apparatus according to claim 10. It is an apparatus for measuring a concentration of a first gas and/or for measuring a pressure in a headspace of a container. The apparatus comprises a transmitter-receiver arrangement according to the invention and an evaluation unit operably connected to the receiver and configured to generate, based on the electromagnetic radiation received by the receiver, a numerical value indicative for the concentration of the first gas and/or for the pressure in the headspace.

Further in the scope of the invention lies a filling and/or closing machine according to claim 11. The filling and/or closing machine comprises a filling station for filling liquid or solid contents into containers, an apparatus according to the invention and a conveyor system configured to transport the containers from the filling station to the measuring zone of the apparatus.

The filling and/or closing machine may comprise an apparatus of the invention having a casing. The casing may be constructed in such manner that it is suitable for clean room environment. In the mounted position inside the filling machine, the casing may have no horizontal faces. Faces of the ceiling of the casing may be arch shaped or may have an inclination angle between 20° and 120° with respect to a horizontal plane, particularly between 30° and 45°, i.e. a surface normal of the faces forms an angle between 20° and 120° with the direction of the force of gravity, particularly between 30° and 45°.

Further in the scope of the invention lies a method according to claim 12. This method is a method of determining a gas concentration of a first gas and/or a pressure in a headspace of a container. The method uses an apparatus according to the invention. The method comprises the step of adjusting a position or a spatial orientation of the transmitter and/or receiver by means of the electrically controllable actuator arrangement.

The invention is further directed to a method according to claim 13. This is a method of producing a tested closed container containing a gaseous phase in a headspace above a liquid or solid content. In the product resulting from the method, the gaseous phase has a gas concentration of a first gas being below a predetermined test limit. The method comprises the steps:

filling the content into the container, thereby establishing the headspace being free of the content, displacing a previous gaseous phase from the interior of the container by guiding a second gas, in particular an inert gas, into the container, closing the filled container by a closing means, determining a gas concentration of the first gas in the headspace of the filled and closed container by using an apparatus according to claim 10, and rejecting the filled and closed container if the determined gas concentration of the first gas is above the test limit or else accept the filled and closed container as tested closed container.

In a variant of the inventive methods, the first gas is oxygen.

In a variant of the inventive methods, a further step of bringing the measuring zone to overlap with the headspace of the container by shifting or rotating the transmitter or receiver by means of the electrically controllable actuator arrangement is performed before the step of determining a gas concentration of the first gas in the headspace of the filled container.

This variant of the method has the advantage, that various types and sizes of containers may be treated without manual intervention, in particular inside a sterile environment. The step of bringing the measuring zone to overlap with the headspace of the container to be measured may be performed when beginning measurement on a batch of identical containers. Positions and spatial orientation needed in this case may be read from a data base containing the respective information for various types of containers. The electrically controllable actuator arrangement then may be controlled to move the transmitter and the receiver to the respective positions and adjust their spatial orientation. In addition, with such an initial positioning or alternatively, positions and spatial orientation of transmitter and receiver may be adjusted for each individual container. Such an adjustment may account for individual variations of different containers of the same type or variations in their position relative to the apparatus. This adjustment may be performed by applying a feedback loop, e.g. to keep the received intensity of electromagnetic radiation close to a maximum.

In a variant of the methods according to the invention, the steps of the method are performed by means of a filling and/or closing machine according to claim 11, and wherein either filled containers continuously pass the measuring zone or wherein a handling system picks individual samples of filled containers and moves them to the measuring zone.

Thus, when applying the methods, the apparatus according to the invention may be used in two modes of operation: first, to test individual samples picked from a batch of filled containers; second, to perform an in-line test of all containers filled.

Figure 2:
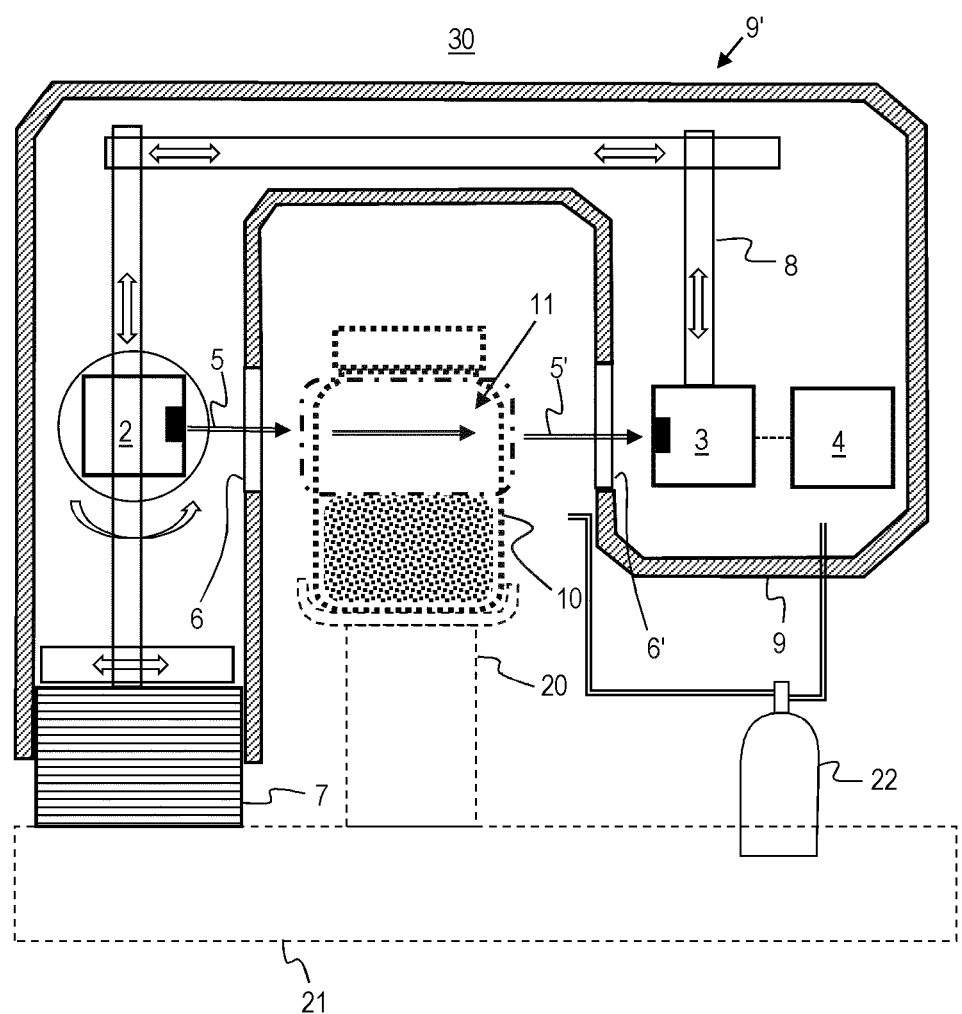

The invention shall now be further exemplified with the help of figures. The figures show:

FIG. 1 a schematic view of a transmitter-receiver arrangement according to the invention;

FIG. 2 a schematic view of an embodiment of the apparatus for measuring a concentration of a first gas and/or for measuring a pressure in a headspace of a container.

FIG. 1 shows schematically and simplified, a transmitter-receiver arrangement 1 according to the invention. The transmitter-receiver arrangement is shown in operation. A transmitter 2 emits electromagnetic radiation 5 towards a measuring zone 11. The electromagnetic radiation is indicated by double lined arrows. Radiation 5', which has passed the measuring zone, is received by a receiver 3. A fixating element 7 enables a fixating of the transmitter-receiver arrangement to elements in its environment. An electrically controllable actuator arrangement 8 is configured to shift or rotate the transmitter and the receiver with respect to the fixating element and with respect to each other. Possible movements, which may be caused by operating the actuator arrangement, are symbolically indicated by arrows. In dashed lines, a container 10, which is not part of the transmitter-receiver arrangement, is shown in a possible measuring position. The measuring zone 11 is overlapping a headspace of the container, i.e. the space above the contents of the container. The actuator arrangement shown is a multiple axis actuator arrangement. It enables e.g. to adjust the height of the measuring zone with respect to the fixating element by simultaneously shifting the position of the transmitter and the receiver up or down. The distance between the transmitter and the receiver may be adjusted, as well. A rotation or tilting movement of the transmitter may be applied to adjust a relative spatial orientation of the transmitter and the receiver, which accounts for refraction effects in the container wall, such as to assure that radiation leaving the measuring zone hits the receiver. By means of a horizontal linear axis directly attached to the fixating element, the transmitter and the receiver may be displaced as a whole in horizontal direction. An evaluation unit 4, shown in dashed lines, may be operatively connected to the receiver 3 and complement the transmitter-receiver arrangement 1 to an apparatus for measuring a concentration of a first gas and/or for measuring a pressure in a headspace of a container.

FIG. 2 shows schematically and simplified an embodiment of the apparatus for measuring a concentration of a first gas and/or for measuring a pressure in a headspace of a container. In addition to elements already discussed in the context of FIG. 1 it comprises a casing 9. The casing defines an interior space containing the transmitter 2, the receiver 3 and the actuator arrangement 8. It defines an exterior space comprising the measuring zone 11. A window 6 and a further window 6' are transparent to the electromagnetic radiation in the wavelength range used for detecting the first gas. Radiation 5 from the transmitter passes across the window 6 to reach the measuring zone 11. Radiation 5', which has passed the measuring zone enters through the further window 6' into the interior space and is received by the receiver 3. The apparatus 30 may be mounted on a machine bed 21, which is indicated by dashed lines. Such a machine bed may belong to a filling machine. Furthermore, transport means 20 are indicated for transporting a container 10 to the apparatus. Such transport means may belong to a conveyor system of a filling machine. In the embodiment shown, a source 22 of a second gas is configured to flush the surrounding of the container and the interior space of the apparatus with a second gas, which is different from the first gas to be measured and which may e.g. be nitrogen in the case that the first gas is oxygen. The ceiling 9' of the casing may have an arched shape or a shape of a saddle roof defined in the direction orthogonal to the cross-section shown in this figure, such that horizontal faces are avoided.

LIST OF REFERENCE SIGNS 1 transmitter-receiver arrangement
2 transmitter
3 receiver
4 evaluation unit
5, 5' radiation
6, 6' transparent windows
7 fixating element
8 actuator arrangement
9 casing
9' ceiling of casing
10 container
11 measuring zone
20 transport means
21 machine bed
22 source of second gas
30 apparatus for measuring a concentration of a first gas and/or for measuring a pressure in a headspace of a container

The invention claimed is:

1. A transmitter-receiver arrangement for an apparatus for measuring a concentration of a first gas and/or for measuring a pressure in a headspace of a container, the transmitter-receiver arrangement defining a measuring zone for accommodating the headspace, and the transmitter-receiver arrangement comprising:
 a transmitter configured to emit electromagnetic radiation covering a wavelength range including an absorption line of the first gas;
 a receiver configured to receive electromagnetic radiation in the wavelength range, the receiver and the transmitter being oriented with respect to each other such as to define a radiation path for the electromagnetic radiation from the transmitter across the measuring zone to the receiver;
 a fixating element for fixing the transmitter-receiver arrangement to the apparatus or to at least one of a filling and a closing machine;
 an electrically controllable actuator arrangement configured to cause at least one of:
 a common translatory displacement and/or rotational displacement of the transmitter and of the receiver relative to the fixating element, and
 a mutual relative translatory displacement and/or rotational displacement of the transmitter relative to the receiver; and
 a casing defining an interior space and having an outer surface towards an exterior space, wherein
 the exterior space includes the measuring zone,
 the electrically controllable actuator arrangement is located in the interior space, and
 the outer surface has an arithmetic average roughness of less than or equal to 1.6 micrometers.

2. The transmitter-receiver arrangement according to claim 1, wherein the first gas is a non-inert gas.

3. The transmitter-receiver arrangement according to claim 2, wherein the first gas is oxygen and wherein the wavelength range includes a wavelength of 760 nm.

4. The transmitter-receiver arrangement according to claim 1, wherein the transmitter comprises:
 a tuneable diode laser adapted to emit electromagnetic radiation in the wavelength range.

5. The transmitter-receiver arrangement according to claim 1,
 wherein the transmitter is arranged in the interior space and is separated from the measuring zone by a window, which is transparent in the wavelength range and which forms at least a part of the outer surface, and
 wherein the receiver is arranged in the interior space and is separated from the measuring zone by the window or by a further window, which is transparent in the wavelength range and which forms a part of the outer surface.

6. The transmitter-receiver arrangement according to claim 1,
 wherein at least a predominant part of the outer surface is formed by materials being resistant to hydrogen peroxide.

7. The transmitter-receiver arrangement according to claim 1, wherein the casing is gas-tight.

8. The transmitter-receiver arrangement according to claim 1, further comprising:
 a source of a second gas configured to flood a region along the radiation path for the electromagnetic radiation with the second gas.

9. An apparatus for measuring at least one of a concentration of a first gas, and a pressure in a headspace of a container, the apparatus comprising:
 the transmitter-receiver arrangement according to claim 1; and
 an evaluation unit operably connected to the receiver and being configured to generate, based on the electromagnetic radiation received by the receiver, a numerical value indicative of at least one of the concentration of the first gas, and the pressure in the headspace.

10. A filling and/or closing machine for filling containers, comprising:
 a filling station for filling the containers with liquid or solid contents;

the apparatus according to claim 9; and a conveyor system configured to transport the containers from the filling station to the measuring zone of the apparatus.

11. A method of determining at least one of a gas concentration of a first gas, and a pressure in a headspace of a container, the method using the apparatus according to claim 9, and the method comprising:

adjusting, by the electrically controllable actuator arrangement, a position or a spatial orientation of at least one of the transmitter and the receiver.

12. The method according to claim 11, wherein the first gas is oxygen.

13. The method according to claim 11, wherein the method is implemented by at least one of a filling and a closing machine, the filling and the closing machine comprising:

a filling station for filling liquid or solid contents into containers; and an apparatus and a conveyor system configured to transport the containers from the filling station to the measuring zone of the apparatus, and wherein either filled containers continuously pass the measuring zone or a handling system picks individual samples of the filled containers and moves the filled containers to the measuring zone.

14. The method according to claim 11, further comprising:

a low temperature sterilization process, wherein vaporized hydrogen peroxide is applied to the transmitter-receiver arrangement.

15. A method of producing a tested closed container containing a gaseous phase in a headspace above a liquid or solid content, the gaseous phase having a gas concentration of a first gas that is below a predetermined test limit, the method comprising:

filling the container with the liquid or solid content, thereby establishing the headspace as being free of the liquid or solid content;

displacing a previous gaseous phase from an interior of the container by guiding a second gas into the container;

closing the filled container by a closing means;

determining a gas concentration of the first gas in the headspace of the filled and closed container by using the apparatus according to claim 9; and rejecting the filled and closed container if the determined gas concentration of the first gas is above the test limit or else accept the filled and closed container as tested closed container.

16. The method according to claim 15, further comprising:

before determining the gas concentration of the first gas in the headspace of the filled container, performing, by the electrically controllable actuator arrangement, shifting or rotating of the transmitter or receiver, thereby causing the measuring zone to overlap with the headspace of the container.

17. The transmitter-receiver arrangement according to claim 1, wherein movement of at least one of the transmitter and the receiver is performed by applying a feedback control loop to keep a received intensity of electromagnetic radiation close to a maximum or above a threshold.

* * * * *